Nov. 3, 1964
D. WILLIAMSON
3,154,917
DIVERTER FOR DUCTED FAN AIRCRAFT
Filed April 15, 1963
2 Sheets-Sheet 2
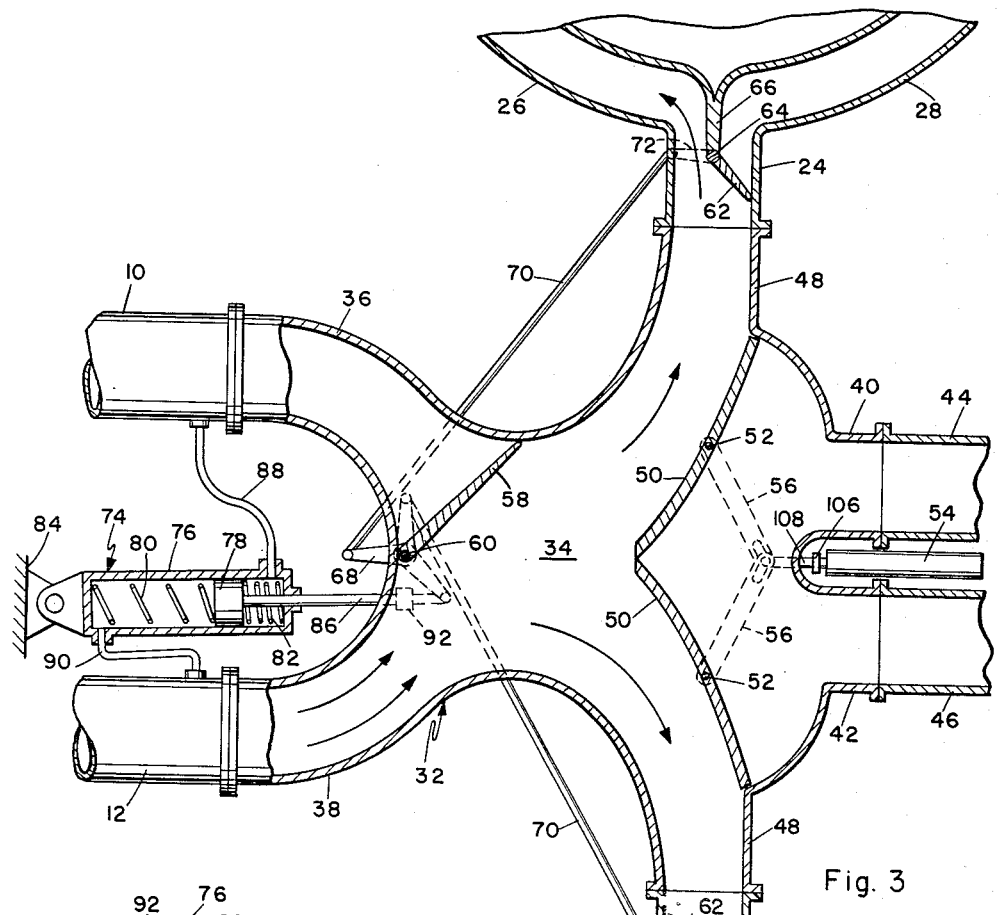
INVENTOR.
DAVID WILLIAMSON
BY
Knox & Knox ര
United States Patent Office 3,154,917
Patented Nov. 3, 1964

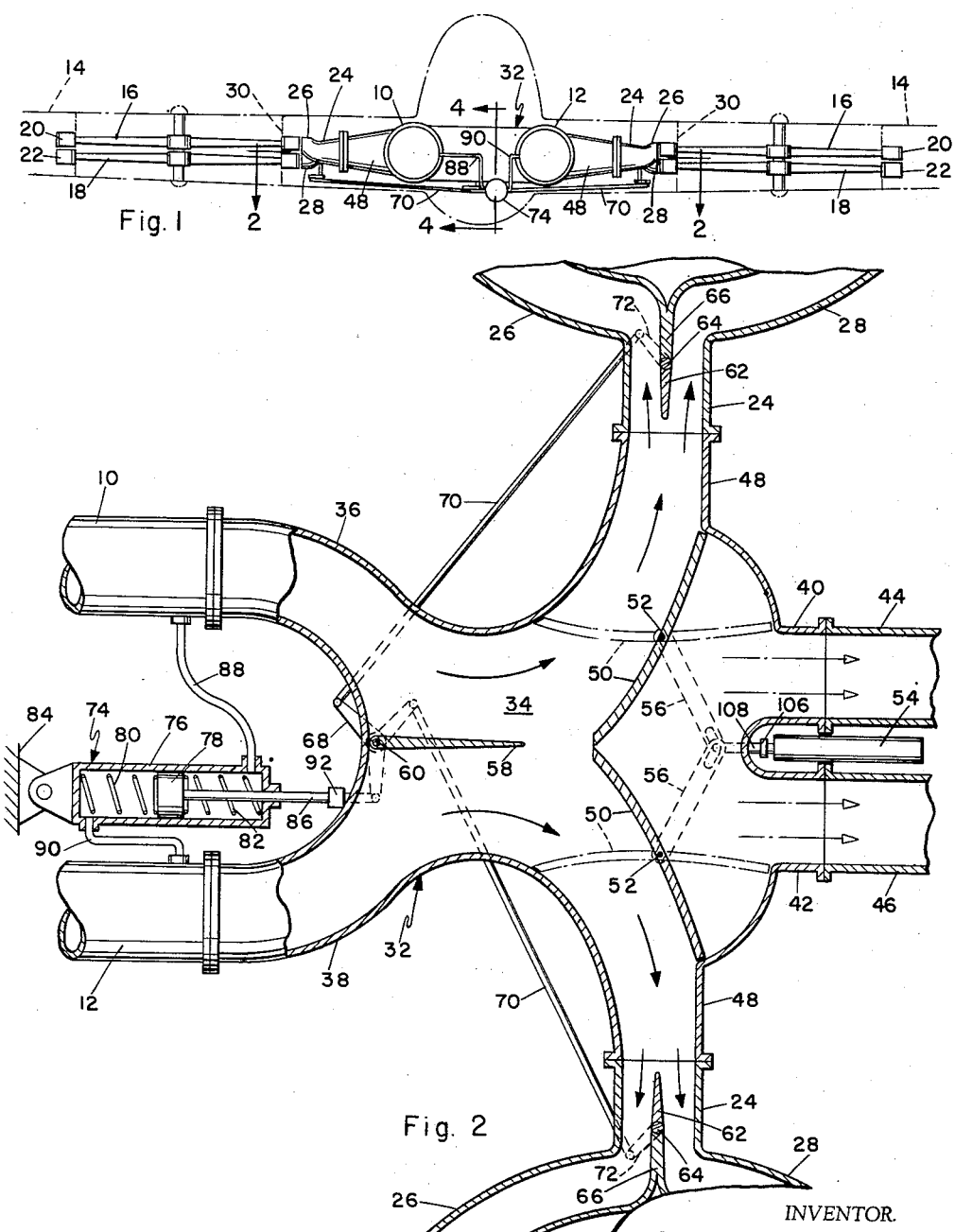

3,154,917
DIVERTER FOR DUCTED FAN AIRCRAFT
David Williamson, Cardiff, Calif., assignor to The Ryan Aeronautical Co., San Diego, Calif.
Filed Apr. 15, 1963, Ser. No. 273,195
6 Claims. (Cl. 60—35.54)

The present invention relates to aircraft propulsion and more specifically to a diverter for ducted fan aircraft.

Certain types of aircraft having ducted fans utilize exhaust gases from primary propulsion turbojet engines to drive the fans, by means of turbines incorporated into the fans or by other suitable power transfer means. In one particular configuration the fans are installed in ducts in the wings and provide direct vertical thrust for take-off and landing. In multiple engined aircraft it is desirable to have a safety system whereby, upon the failure of one engine, the exhaust gases of the other engine or engines is diverted to the fans equally, so avoiding asymmetrical thrust. Cross over ducts have been devised to interconnect each engine with each fan, but these are complex, require considerable space and have duplicated ducts which must be routed around each other, resulting in bends and junctions which interfere with efficient flow.

The primary object of this invention, therefore, is to provide a diverter having a single chamber which connects a pair of turbojet engines with a pair of ducted fans, in such a manner that the fans are driven equally by the exhaust gas from one or both engines.

Another object of this invention is to provide a diverter incorporating simple valve mechanism for directing exhaust gases to the fans, or rearwardly for primary propulsion, with smooth transition between the two positions.

Another object of this invention is to provide a diverter having means for detecting failure of an engine and automatically shifting valves to block off the non-operating engine and divert the remaining exhaust gases to the fans in an economical manner.

A further object of this invention is to provide a diverter having lock-out means by which the automatic engine failure detection system is disabled while starting the engines in normal thrust position of the valves.

With these objects in view the invention consists in the novel combination and arrangement of elements and structure, as described in the specification, pointed out in the claims and illustrated in the drawings, in which:

FIGURE 1 is a diagrammatic front elevation view of the diverter system incorporated in an aircraft;

FIGURE 2 is an enlarged sectional view taken on line 2—2 of FIGURE 1 and rotated 90 degrees;

FIGURE 3 is a sectional view similar to FIGURE 2, illustrating the operation in the event of an engine failure;

FIGURE 4 is an enlarged fragmentary sectional view taken on line 4—4 of FIGURE 1; and FIGURE 5 is a sectional view taken on line 5—5 of FIGURE 4.

Similar characters of reference indicate similar or identical elements and protions throughout the specification and throughout the views of the drawing.

General Structure

As illustrated in FIGURE 1, the system is installed in an aircraft having a pair of turbojet engines 10 and 12 for primary propulsion, and ducted fans mounted in wings 14 for vertical take-off and landing. Each fan assembly comprises an upper fan 16 and a lower fan 18, which are counter-rotating and are driven by integral tip turbines 20 and 22. Exhaust gases from engines 10 and 12 are fed to the turbines through ducts 24, each duct being divided into an upper scroll 26 and a lower scroll 28 leading separately to tip turbines 20 and 22, respectively. The fans are mounted in circular ducts 30 extending vertically through the wings 14, the general arrangement and operation of such an installation being well known. Other engine and fan arrangements may be used according to the specific aircraft design.

Diverter Structure

The diverter, generally indicated at 32, comprises a unitary chamber 34 having inlets at its forward end in the form of bifurcated throat portions 36 and 38 which connect with the turbojet engines 10 and 12, respectively, so that all of the exhaust gases from both engines enter said chamber. At the rear of chamber 34 are bifurcated outlets 40 and 42 leading to tailpipes 44 and 46, through which the exhaust gases pass for normal propulsive thrust. Extending from opposite sides of chamber 34 are lateral ducts 48 connected to ducts 24. The interior contours of the diverter 32 are smoothly curved for flow efficiency, the specific shape being a matter of aerodynamic design for a particular installation.

At the sides of chamber 34 in the openings to lateral ducts 48 are diverter valves 50, which in one position, indicated in broken line in FIGURE 2, block the lateral ducts and cause exhaust gases to flow straight through the diverter to tailpipes 44 and 46. Valves 50 are mounted on hinge pins 52 and can be swung to meet at their forward ends at the center of chamber 34, as indicated in full line, to block the tailpipes and divert the exhaust gases through lateral ducts 48. The valves 50 are actuated by a jack 54, of any suitable type, coupled to arms 56 on hinge pins 52.

Centrally mounted at the forward end of chamber 34 is a blocking valve 58 which can swing to either side on hinge pin 60 to block either throat portion 36 or 38 selectively. In neutral position the blocking valve is streamlined to gas flow, as indicated in FIGURE 2. In each duct 24 is a selector valve 62 mounted on a hinge pin 64 at the end of a dividing wall 66 which divides gas flow to the gas distributing scrolls 26 and 28. The selector valve 62 can swing from side to side to block either the scroll 26 or scroll 28, selectively. Fixed to hinge pin 60 is a generally Y-shaped, three armed bellcrank 68, two arms of which are connected by tie rods 70 to arms 72 on the hinge pins 64. Thus the blocking valve 58 and selector valves 62 are interconnected and operate simultaneously.

Between the turbojet engines 10 and 12 is a pressure differential sensor 74, comprising a cylinder 76 in which is mounted a piston 78 held centered between springs 80 and 82. One end of cylinder 76 is attached to fixed structure 84 and extending from the other end is a piston rod 86 connected to the third arm of bellcrank 68. A pick-up tube 88 is connected between one end of cylinder 76 and the engine 10, another pick-up tube 90 being connected from the other end of said cylinder to engine 12. Other types of pressure differential sensors may be used, that illustrated being a simple mechanical type.

Fixed to piston rod 86 is a detent block 92 having a transverse slot 94, and immediately below is a locking vane 96 pivotally mounted on fixed structure to swing into said slot and prevent axial movement of the piston rod, as in FIGURES 4 and 5. The locking vane 96 is connected to an actuating crank 98 operated by a rod 100 slidable through one end of the actuating crank, said rod having fixed limit stops 102 and 104 so that the locking vane is actuated at each end of a stroke of the rod. Rod 100 is fixed by a bracket 106 to the plunger 108 of jack 54 so that, when said plunger is extended forwardly and diverter valves 50 are closing lateral ducts 48, the locking vane 96 holds detent block 92 and prevents operation of blocking valve 58, as in the full line position in FIGURES 4 and 5. Any other suitable connection, such as fluid pressure, electrical, or cable means can be used between locking vane 96 and the jack 54.

*Operation*

When the engines 10 and 12 are being started the diverter valves 50 are closed across lateral ducts 48, as in the broken line position in FIGURE 2. The plunger 108 is extended forwardly as in full line in FIGURE 4, so that the locking vane 96 holds piston rod 86 against movement. Any suitable pilot actuated control may be used for the jack 54, the remainder of the system being automatic. With the pressure differential sensor 74 disabled by locking vane 96, the pressure differential resulting from one engine starting will not cause the blocking valve 58 to swing and close off the non-operating engine.

For normal forward take-off the diverter valves 50 are left in the starting position so that all of the exhaust gases pass through tailpipes 44 and 46. In this condition the aircraft behaves as a conventional twin jet aircraft and failure of one engine will result in loss of power and asymmetrical thrust, which can usually be handled by the pilot. The high velocity exhaust from the operating engine does not have the tendency to flow back into the non-operating engine, since there is no obstruction to deflect the flow or cause back pressure.

For vertical take-off the plunger 108 is retracted, swinging diverter valves 50 across the chamber 34 to block tailpipes 44 and 46 and open the lateral ducts 48. Exhaust gases from the engines are then directed to the tip turbines 20 and 22 to drive the fans 16 and 18, so providing vertical thrust. From the chamber 34 the gases are evenly distributed to scrolls 26 and 28 on both sides, without complex cross-over flow or abrupt directional changes. In transition from vertical to forward flight the diverter valves 50 are gradually moved to open tailpipes 44 and 46, so that some of the exhaust gases are ejected rearwardly to propel the aircraft forward. At the same time the gas flow to the fans decreases, the fan lift diminishing as the forward speed of the aircraft builds up lift on the wings.

In vertical flight or during transition, failure of one engine will cause an intermediate pressure differential in the engines. In FIGURE 3 the engine 10 is assumed to be inoperative, causing a drop in pressure in that engine, so that the pressure in engine 12 applied to sensor 74 drives piston 78 rearwardly. The piston rod 86 moves bellcrank 68 and swings the blocking valve 58 to the side to block engine 10 and prevent exhaust gases from flowing back into that engine. Simultaneously the selector valves 62 swing to block scrolls 28, thus directing the exhaust gases into scrolls 26. The gas flow from a single engine would not be sufficient to drive both fans in each wing at high enough speed to be useful, but can certainly drive one fan in each wing at full speed. Due to the flow characteristics of counter-rotating ducted fans, it is possible for a single fan of a pair to deliver about 60% of the normal total thrust. With more than half of the normal lift still available the aircraft can be landed safely and even maneuvered within limits, depending on the load being carried. In any event, the interconnected valves, actuated by the pressure differential sensor, ensure that the exhaust gases are used to their fullest effect. It will be obvious that if engine 12 should fail, the blocking valve 58 would be operated to block that engine and selector valves 62 would direct the gases of the remaining operative engine to scrolls 28. Due to the spring centering of piston 78, slight pressure differences caused by variations in engine throttle settings or normal engine speed changes will not cause blocking of flow, a total or near total pressure drop being necessary to initiate the action.

The valve action is automatic and does not require any operation by the pilot, so eliminating reaction time and allowing more rapid recovery after an engine failure. With both engines operating or both shut off, the sensor 74 returns the valves to neutral position.

As illustrated, the system includes counter-rotating fans each with its own gas conducting scroll to the tip turbine. However, the double scroll arrangement is equally applicable to a single fan. In this instance, if one engine should fail, the gases from the remaining engine would be directed to one half scroll of each single fan. This would maintain gas pressure and velocity at each tip turbine and ensure more efficient power utilization, than if the reduced volume of gas were distributed over the full scroll area.

The system is applicable to virtually any multiple engine installation driving one or more ducted fans, either single or counter-rotating, with divided gas conducting scrolls or ducts to the fans.

It is understood that minor variation from the form of the invention disclosed herein may be made without departure from the spirit and scope of the invention, and that the specification and drawings are to be considered as merely illustrative rather than limiting.

I claim:

1. In an aircraft having ducted fans, turbine means connected to said fans to drive the fans, and a plurality of gas generating sources for operation of said turbine means, a gas flow diverter comprising:

a chamber having inlets for connection to said gas generating means and outlets for generally straight-through gas flow;

lateral ducts extending from said chamber between said inlets and outlets and communicating with one of said turbine means;

diverter valve means in said chamber operable to close said lateral ducts and said outlets selectively;

blocking valve means in said chamber adjacent said inlets;

pressure differential sensing means adjacent said inlets to detect differences in pressure therebetween;

and actuating means interconnecting said sensing means with said blocking valve means to block an inlet at which a pressure drop is detected.

2. A gas flow diverter according to claim 1 and including lock-out means connected between said diverter valve means and said blocking valve means, to prevent operation of said blocking valve means when the diverter valve means is closing said lateral ducts.

3. In an aircraft having ducted fans, turbine means connected to said fans to drive the fans, and a plurality of gas generating sources for operation of said turbine means, a gas flow diverter comprising:

a chamber having inlets for connection to said gas generating means and outlets for generally straight-through gas flow;

lateral ducts extending from said chamber between said inlets and outlets;

diverter valve means in said chamber operable to close said later ducts and said outlets selectively;

said lateral ducts having bifurcated gas distributing portions communicating with one of said turbine means;

selector valves in said bifurcated portions and being operable to close either portion selectively;

blocking valve means in said chamber adjacent said inlets;

pressure differential sensing means adjacent said inlets to detect differences in pressure therebetween;

and actuating means interconnecting said sensing means with said blocking valve means to block an inlet at which a pressure drop is detected.

4. In an aircraft having ducted fans, turbine means connected to said fans to drive the fans, and a plurality of gas generating sources for operation of said turbine means, a gas flow diverter comprising:

a chamber having inlets for connection to said gas generating means and outlets for generally straight-through gas flow;

lateral ducts extending from said chamber between said inlets and outlets;
diverter valve means in said chamber operable to close said lateral ducts and said outlets selectively;
said lateral ducts having bifurcated gas distributing portions communicating with one of said turbine means;
selector valves in said bifurcated portions and being operable to close either portion selectively;
blocking valve means in said chamber adjacent said inlets;
pressure differential sensing means adjacent said inlets to detect differences in pressure therebetween;
actuating means interconnecting said sensing means with said blocking valve means to block an inlet at which a pressure drop is detected;
said selector valves being coupled to said blocking valves to close one side of each of said bifurcated portions when one of said inlets is blocked.

5. In an aircraft having ducted fans, turbine means connected to said fans to drive the fans, and a plurality of gas generating sources for operation of said turbine means, a gas flow diverter comprising:
a chamber having inlets for connection to said gas generating means and outlets for generally straight-through gas flow;
lateral ducts extending from said chamber between said inlets and outlets;
diverter valve means in said chamber operable to close said lateral ducts and said outlets selectively;
said lateral ducts having bifurcated gas distributing portions communicating with one of said turbine means;
selector valves in said bifurcated portions and being operable to close either portion selectively;
blocking valve means in said chamber adjacent said inlets;
pressure differential sensing means adjacent said inlets to detect differences in pressure therebetween;
actuating means interconnecting said sensing means with said blocking valve means to block an inlet at which a pressure drop is detected;
said selector valves being coupled to said blocking valves to close one side of each of said bifurcated portions when one of said inlets is blocked;
and lock-out means connected between said diverter valves and said pressure differential sensing means to prevent operation of said blocking valve when the diverter valves are closing said lateral ducts.

6. In an aircraft having ducted fans, turbine means connected to said fans to drive the fans, and a plurality of gas generating sources for operation of said turbine means, a diverter comprising:
a chamber having inlets for connection to said gas generating sources, and outlets substantially opposite said inlets for generally straight through gas flow;
lateral ducts extending from said chamber and each having bifurcated gas distributing portions communicating with one of said turbine means;
diverter valve means in said chamber and being movable to close said lateral ducts and said outlets selectively;
a blocking valve mounted in said chamber adjacent said inlets;
selector valves in said bifurcated portions pivotally mounted to close either side thereof, said selector valves being interconnected with said blocking valve to operate therewith;
sensing means coupled to said gas generating sources adjacent said inlets to detect a pressure drop at a specific inlet;
said sensing means being operatively connected to said blocking valve to close an inlet at which a pressure drop is detected.

References Cited by the Examiner
UNITED STATES PATENTS 2,940,689  6/60  Howell _____ 244—12
3,033,492  5/62  Rowe _____ 244—23
3,060,685 10/62  Tonnies et al. _____ 60—35.54
3,068,647 12/62  Santamaria et al. ____ 60—39.09 X SAMUEL LEVINE, *Primary Examiner.*